(12) United States Patent
Lee et al.

(10) Patent No.: US 9,092,384 B2
(45) Date of Patent: Jul. 28, 2015

(54) QUANTIFYING METHOD FOR INTRINSIC DATA TRANSFER RATE OF ALGORITHMS

(75) Inventors: Gwo Giun Lee, Sunnyvale, CA (US); He-Yuan Lin, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 255 days.

(21) Appl. No.: 13/700,336

(22) PCT Filed: Jul. 20, 2011

(86) PCT No.: PCT/US2011/044671
§ 371 (c)(1),
(2), (4) Date: Nov. 27, 2012

(87) PCT Pub. No.: WO2012/099622
PCT Pub. Date: Jul. 26, 2012

(65) Prior Publication Data
US 2013/0124593 A1   May 16, 2013

(30) Foreign Application Priority Data

Jan. 19, 2011   (TW) .............................. 100102011 A (51) Int. Cl.
*G06F 17/10* (2006.01)
*G06F 17/16* (2006.01)
*H04N 19/43* (2014.01)

(52) U.S. Cl.
CPC ................ *G06F 17/16* (2013.01); *G06F 17/10* (2013.01); *H04N 19/43* (2014.11)

(58) Field of Classification Search
None
See application file for complete search history.

(56) References Cited

U.S. PATENT DOCUMENTS

| 5,857,101 A * | 1/1999 | Ballard et al. ................... 713/1 |
| 2009/0216799 A1 | 8/2009 | Manjrekar et al. |
| 2013/0124593 A1* | 5/2013 | Lee et al. ...................... 708/520 |

OTHER PUBLICATIONS

Lee et al., "Quantifying intrinsic parallelism using linear algebra for algorithm/architecture coexploration", IEEE Transactions on Parallel and Distributed Systems, vol. 23, (5), May 5, 2012, pp. 944-957.
Lee et al., "Chapter 23—Algorithm/Architecture Coexploration", Multimedia Image and Video Processing, Second Edition, Mar. 2012, CRC Press, vol. 23, pp. 573-608.
Lee et al., Algorithmic Complexity analysis on data transfer rate and data storage for multidimensional signal processing systems, 2013 SIPS IEEE Workshop on Signal Processing Systems, Oct. 16, 2013, pp. 171-176.
Lin et al., "Quantifying Intrinsic Parellelism via Eigen-Decomposition of Dataflow Graphs for Algorithm/Architecture Co-exploration," IEEE Workshop on Signal ProcessingSystems (SIPS) (Oct. 6, 2010) 317-322.

(Continued)

*Primary Examiner* — David H Malzahn (57) ABSTRACT

The quantifying method for intrinsic data transfer rate of algorithms is provided. The provided quantifying method for an intrinsic data transfer rate includes steps of: detecting whether or not a datum is used; providing a dataflow graph G including n vertices and m edges, and a Laplacian matrix L having ixj elements L(i,j) when the datum is not reused, wherein each of the vertices represents one of an operation and a datum, each of the edges represents a data transfer, and vi is the ith vertex; and using the Laplacian matrix L to estimate a maximum quantity of the intrinsic data transfer rate.

10 Claims, 4 Drawing Sheets (56) References Cited

OTHER PUBLICATIONS

Ravasi et al., "High-Abstraction Level Complexity Analysis and Memory Architecture Simulations of Multimedia Algorithms," IEEE Transactions on Circuits and Systems for Video Technology (May 2, 2005) 15(5):673-684.

International Search Report and Written Opinion from PCT/US2011/044671.

* cited by examiner

QUANTIFYING METHOD FOR INTRINSIC DATA TRANSFER RATE OF ALGORITHMS

This application is a 35 U.S.C. §371 national phase application of PCT/US2011/044671, which was filed Jul. 20, 2011 and is incorporated herein by reference as if fully set forth.

FIELD OF THE INVENTION

The application claims the benefit of Taiwan Patent Application No. 100102011, filed on Jan. 19, 2011, in the Taiwan Intellectual Property Office, the disclosures of which are incorporated herein in their entirety by reference.

The present invention relates to a quantifying method for intrinsic data transfer rate of algorithms. More particularly, it relates to a method for estimating a maximum quantity of the intrinsic data transfer rate via providing a dataflow graph G including n vertices and m edges, and a Laplacian matrix L having ixj elements L(i,j).

BACKGROUND OF THE INVENTION

Algorithm/Architecture Co-exploration (AAC) design methodology that can concurrently explore both algorithms and architectures based on intrinsic algorithmic complexity extraction and analysis becomes a design paradigm in the emerging electronic system level (ESL) design era. Intrinsic data transfer rate of algorithms is one of the important complexity metrics that can facilitate the exploration of the bandwidth for generic platforms for the ever more complex algorithms adopted in modern and future signal and information processing applications. Hence, quantifying data transfer rates needed by algorithms becomes necessary and essential for concurrently optimizing both algorithms and architectures.

Ravasi et al. have proposed to extract the computational complexity of algorithms by software instrumentation and estimation of the data-transfer and storage requirements based on the customizable virtual memory architecture (M. Ravasi and M. Mattavelli, "High-abstraction level complexity analysis and memory architecture simulations of multimedia algorithms," IEEE Trans. on Circuits and Systems for Video Technology, pp. 673-684, Vol. 15, No. 5, May 2005.). This technique can effectively extract the platform-independent computational complexity. However, the data-transfer and storage requirements are rather dependent upon the customizable virtual memory architecture and, therefore, are not intrinsic to the algorithm itself.

The existing technique (e.g., M. Horowitz, A. Joch, F. Kossentini and A. Hallapuro, "H.264/AVC baseline profile decoder complexity analysis," IEEE Trans. on Circuits and Systems for Video Technology, pp. 704-716, Vol. 13, No. 7, July 2003.) measures the complexity of algorithms by profiling them on various target platforms. The amounts of data transfer of algorithms are measured in terms of loading and storing operations in Horowitz et al. The major drawback of this prior art (Horowitz et al.) is that the measured algorithmic complexity on data transfer rate depends rather on the target processor-oriented platforms but not on the algorithms themselves. Therefore, the complexity measured is again not intrinsic to the algorithms and is biased by the target platforms.

Since the data transfer rates are significantly influenced by the data granularity of the dataflow representing the algorithms, data transfer rates measurements at multiple data granularities is essential and necessary to characterize the complexity of algorithms. However, the two aforementioned techniques do not support multigrain data transfer rate analysis. This is also a major drawback of the two techniques.

Keeping the drawbacks of the prior arts in mind, and employing experiments and research full-heartily and persistently, the applicant finally conceived a quantifying method for intrinsic data transfer rate of algorithms.

SUMMARY OF THE INVENTION

It is therefore an object of the present invention to provide a systemic method based on algebraic theory to quantify the algorithmic intrinsic data transfer rates at various data granularities, facilitating porting algorithms onto emerging platforms. The extracted data transfer rates of the present invention are intrinsic to algorithms and are unbiased for either hardware or software, thus, they are platform-independent and are capable of assisting in AAC for generic applications.

According to the first aspect of the present invention, a quantifying method for an intrinsic data transfer rate comprises steps of: detecting whether or not a datum is used; providing a dataflow graph G including n vertices and m edges, and a Laplacian matrix L having ixj elements L(i,j) when the detected datum is not reused, wherein each of the vertices represents one of an operation and a datum, each of the edges represents a data transfer, and vi is the ith vertex; providing a vector x having n elements such that $x^T L x = \Sigma(xi-xj)^2$ and $(vi, vj) \epsilon E(G)$ to calculate a maximum value of a total number of edge cuts in the m edges when the n vertices are divided into sub-graphs, each of which includes at least two adjacent vertices, wherein the n elements are n variables related to the n vertices of the dataflow graph G, and $(vi, vj) \epsilon E(G)$ represents all operation pairs when vi is adjacent to vj; and using the maximum value to estimate a maximum quantity of the intrinsic data transfer rate.

According to the second aspect of the present invention, a quantifying method for an intrinsic data transfer rate comprises steps of: detecting whether or not a datum is used; providing a dataflow graph G including n vertices and m edges, and an incidence dependency matrix M having ixj elements M(i,j) when the detected datum is reused, wherein the i represents the ith vertex, the j represents the jth edge, each of the vertices represents one of an operation and a datum, each of the edges represents a data transfer, and vi is the ith vertex; providing a vector x having n elements to calculate a value of Mx so as to obtain respective representative numbers of an in-edge-cut, an out-edge-cut, and a non-edge-cut in the m edges when the n vertices are divided into sub-graphs, each of which includes at least two adjacent vertices, wherein the n elements are n variables related to the n vertices of the dataflow graph G; and using the incidence dependency matrix M to estimate a size of an extra local storage required due to a reuse of the datum.

According to the third aspect of the present invention, a quantifying method for an intrinsic data transfer rate comprises steps of: detecting whether or not a datum is used; providing a dataflow graph G including n vertices and m edges, and a Laplacian matrix L having ixj elements L(i,j) when the datum is not reused, wherein each of the vertices represents one of an operation and a datum, each of the edges represents a data transfer, and vi is the ith vertex; and using the Laplacian matrix L to estimate a maximum quantity of the intrinsic data transfer rate.

According to the fourth aspect of the present invention, a quantifying method for an intrinsic data transfer rate comprises steps of: detecting whether or not a datum is used; providing a dataflow graph G including n vertices and m edges and an incidence dependency matrix M having ixj elements M(i,j) when the datum is reused, wherein the i represents the ith vertex, the j represents the jth edge, each of the vertices represents one of an operation and a datum, each of the edges represents a data transfer, and vi is the ith vertex; using the incidence dependency matrix M to estimate a minimum amount of the intrinsic data transfer rate under a circumstance of a maximum data reuse; and estimating a size of an extra local storage required due to a reuse of the datum.

The present invention may best be understood through the following descriptions with reference to the accompanying drawings, in which:

DETAILED DESCRIPTION OF THE PREFERRED EMBODIMENT

The complexity metric is only dependent upon the characteristics of dataflow of algorithms and are transparent to the hardware/software implementation details. The presented intrinsic complexity measurement is platform-independent. Hence, it plays a critical role in mapping complex algorithms onto generic architecture or emerging platforms.

Algorithms can be represented by natural languages, mathematical expressions, flowcharts, pseudo codes, high-level programming languages, and so on. In signal processing applications, mathematical expression is one of the most abstract, definite, and compact methods to represent an algorithm. The corresponding signal flow graphs and dataflow models can be then obtained based on mathematical representation. The dataflow model is capable of depicting the interrelationships between computations and communications. Consequently, the graph generated by the dataflow model clearly reveals data dependencies between each operation via vertices denoting the operations and directed edges representing the sources and destinations of the data, i.e., the flow of data.

Compared with traditional high-level programming models, dataflow models inheriting from the mathematical representation can contain intrinsic complexity information and reveal the architectural characteristics that are transparent to implementation details. In traditional design methodologies, the developments of algorithms and architectures are separately performed in two isolated stages. In contrast, the dataflow model is capable of bridging seamlessly the gap between the two isolated design stages, enabling the concurrent optimization of both algorithm and architecture for AAC.

Data granularity of dataflow models is an important parameter in AAC. Coarser and finer data granularities correspond to higher and lower levels of abstraction, respectively. Furthermore, the granularity of operations is consistent with the data granularity. Hence, the operations can be at the level of logic operations, arithmetic operations, filters, tasks or packet processing, depending on application scenarios. To satisfy throughput requirements for real-time visual computing applications, workloads of algorithms have to be done in intervals, with the timing accuracy depending on the data granularity. Data granularity influences significantly the algorithmic data transfer rate, since it is a complexity metric related to timing information.

The executing orders of dataflow also influence the algorithmic data transfer rate. This is because dataflows with different executing orders result in various degrees of data reuse, which is crucial factor affecting algorithmic data transfer. Given the dataflow of an algorithm, platform-independent complexity analysis on data transfer rate can be performed accordingly. This invention quantifies the amount of data transfer and hence data transfer rate based on the concept of edge cuts of dataflow graphs at a fine data granularity, which is a pixel in visual computing applications. The data transfer rates at coarser granularity can be easily obtained by encapsulating the fine granularities into coarser one. This strategy can be applied to systematically analyze the dataflow at multiple data granularities without rebuilding dataflow models. After taking throughput requirements for real-time applications into consideration, the corresponding average data rates can also be calculated at fine and coarse granularities, respectively. Involving the memory latency and communication overheads in the instantaneous data rate, the peak bandwidth can be estimated for further determining the bus width and clock rate.

1. Maximum Data Transfer Rate without Data Reuse

To execute the functions of an algorithm, input data are read and consumed by operators to produce output data. If data reuse is not considered, some data are transferred several times. The maximum amount of data transfer is an intrinsic complexity metric, which measures the theoretical upper bound amount of data transfer without data reuse.

Based on dataflow graphs of algorithms, the maximum amount of input and output data transfer can be modeled as an edge cut problem. Let G be a dataflow graph consisting of n vertices denoting operations or data and m edges representing data transfer. Based on the definition of data granularity, it is easy to calculate the maximum amount of input data transfer by partitioning the vertices representing input data into a sub-graph and reset the vertices representing output data into another sub-graph. The size of edge cut by such partition reveals the maximum amount of input data transfer. In a similar manner, the maximum amount of output data transfer can be quantified via partitioning the vertices denoting output data into a sub-graph.

In this invention, the quantification of size of edge cut is performed via the Laplacian matrix L in spectral graph theory, which is capable of representing the connectivity of G in a compact form expressed by:

$$L(i, j) = \begin{cases} \text{degree}(v_i) & \text{if } i = j, \\ -1 & \text{if } v_i \text{ and } v_j \text{ are adjacent}, \\ 0 & \text{otherwise.} \end{cases} \quad (1),$$

where $\text{degree}(v_i)$ is the number of edges connected to i-th vertex $v_i$. In the Laplacian matrix, the ith diagonal element shows the number of operations or data that are connected to the ith operation; the off-diagonal element denotes whether two operations are connected.

The theoretical maximum amount of data transfer can then be estimated based on the Laplacian matrix. Let x be a vector of n variables associated with the n operations or data of G, the value of $x^tLx$ equals the sum of square difference between the adjacent vertices:

$$x^tLx = \sum_{(v_i,v_j)\in E(G)} (x_i - x_j)^2, \quad (2)$$

where $(v_i, v_j)\in E(G)$ represents all the operation pairs $(v_i, v_j)$ whose $v_i$ and $v_j$ are adjacent to each other.

By assigning the elements in x to be either 1 or −1, x can be used as an indicator vector, which represents different ways of cutting the dataflow graph into two sub-graphs. In this case, the value of $x^tLx$ is equal to 4×size of the edge cut. The reasons are as follows: if two adjacent vertices are assigned the same value to indicate that they are grouped into the same sub-graph, their square difference is equal to zero; otherwise, if two adjacent vertices are assigned opposite values, it shows that they are grouped into different sub-graphs, the associated edge is cut, and their square difference is four. Hence, the value of $x^tLx$ is equal to four times of the number of edges being cut.

Figure 1:
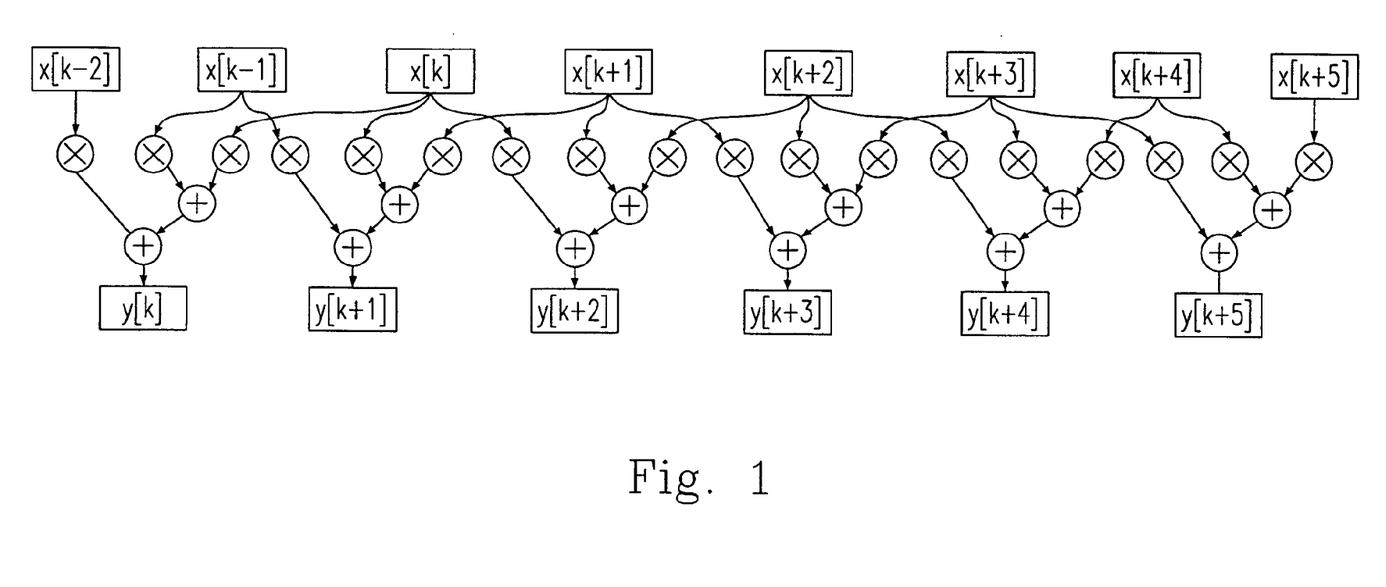
FIG. 1 is a dataflow graph according to the preferred embodiment of the present invention.

FIG. 1 is a dataflow graph according to the preferred embodiment of the present invention. In FIG. 1, a simple example explaining the edge cut method is shown. The graph represents the dataflow of a three-tap filter producing six pixels, in which the circle and rectangular vertices denote the operations and input/output data, respectively. If we encapsulate every two output data and the associated operations into a sub-graph, the data granularity will be 2×1. After analyzing the amount of data transfer at this data granularity, the maximum input and output values are shown as 6 and 2, even if only 4 data are read. This is because some data are read more than once. Similarly, the maximum amounts of data read corresponding to the 3×1 and 6×1 data granularities are 9 and 18, respectively. By systematically encapsulating the vertices into the sub-graphs at various data granularities, the multigrain amount of data transfer can be analyzed accordingly. This method can be efficiently extended to support two-dimensional data granularities that are commonly used in visual computing applications.

It is possible to allocate some local storage to save the reused data and, hence, reduce the amount of external data transfer. However, data reuse needs extra storage in addition to the minimum storage requirements. Other than the amount of data transfer, the size of the extra storage also significantly depends on the data granularities. This gives rise to the possibility of trade-off between the amount of data transferred and storage size.

2. Data Transfer Rate with Data Reuse

The amount of data transfer with data reuse can be quantified according to the non-overlapped input data needed by two consecutive processed granularities. The overlapped input data of the previous and current-processed granularities are reused. To obtain sufficient input data for the current-processed granularity, only the non-overlapped portion should be read. Consequently, the amount of data transfer needed by the non-initial processed granularities can be estimated based on the non-overlapped portion of input data.

According to dataflow of algorithms, the non-overlapped input data of each processed data granularity can be systematically identified and quantified based on algebraic graph theory. This can be easily done via our incidence dependency matrix M of the dataflow graphs:

$$M(i, j) = \begin{cases} 1, & \text{if } vi \text{ is the tail of } ej. \\ -1, & \text{if } vi \text{ is the head of } ej. \\ 0 & \text{otherwise.} \end{cases} \quad (3)$$

The set of dataflow information, including the amount of data and directions of flow, are represented in M. The horizontal and vertical indices of M correspond to vertex and edge, respectively. The edge cut set of a partition can then be obtained according to the result of Mx denoted by y, where x is an n-tuple vector similar to the indicator vector in the Laplacian method. The elements in the resultant vector y are 2, 0, or −2, indicating that the corresponding edges are in-edge-cut, non-edge-cut or out-edge-cut, respectively. According to the in-edge-cut and out-edge-cut, the source and destination vertices denoting input and output data of the processed granularity can be identified, respectively.

The input data needed by a processed granularity can be easily identified based on the incidence dependency matrix. This method can be applied to estimate the non-overlapped input data of two consecutively processed granularities. Such measure reveals the minimum amount of data transfer needed by the current-processed granularity, with the consideration of maximum data reuse. The size of extra local storage for data reuse can then be estimated according to the union of input data of consecutively processed granularities.

Figure 2:
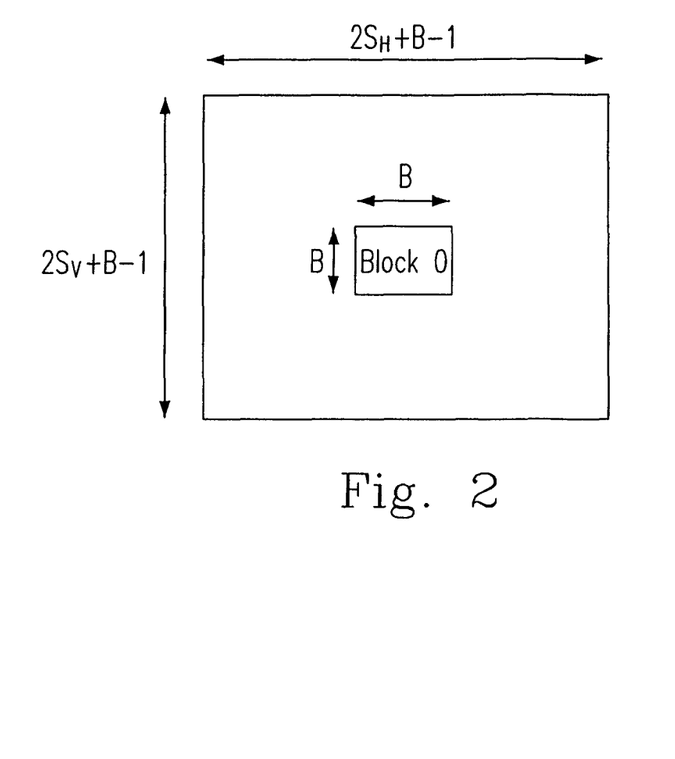
FIG. 2 is a schematic diagram of a search window of a motion estimation.

This application form takes the motion estimation for example for the tradeoff between average external data transfer rate and the local storage size. Similar results can be found in the motion compensation. FIG. 2 is a schematic diagram of a search window of a motion estimation. FIG. 2 shows the search window of the motion estimation whose search range is [−SH, SH) in the horizontal direction and [−SV, SV) in the vertical direction and the block size is B×B. In the case that no data in the search window are reused, the maximum amount of data transfer for finding a motion vector (MV) is equal to NS×B×B plus B×B, where NS is the number of search location depending on the search strategy. For full search, the maximum amount of data transfer needed is 4×SH×SV×B×B plus B×B. As the data in the search windows is reused, the amount of data transfer needed to figure out the MV of a block is equal to (2SH+B−1)×(2SV+B−1) plus B×B and the local storage size for search window is equal to (2SH+B−1)×(2SV+B−1) as well. The average data transfer rate can then be calculated according to the number of block per second for real-time applications.

Figure 3:
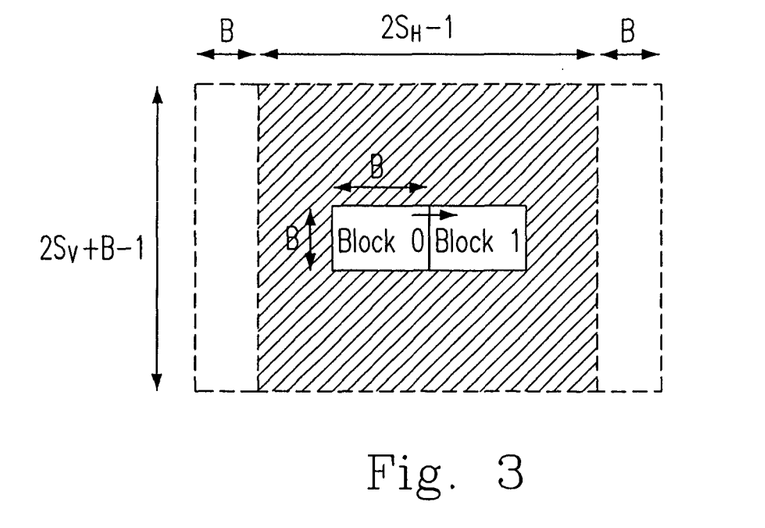
FIG. 3 is a schematic diagram of a horizontal search window data reuse scheme.

FIG. 3 is a schematic diagram of a horizontal search window data reuse scheme. The horizontal search window data reuse scheme can reduce the external data transfer rate with little overhead on local storage size as shown in FIG. 3. In this scheme, only the non-overlapped region of the search windows of two consecutive blocks in the horizontal direction has to be read. Consequently, the amount of data transfer for the second block is only B×(2SV+B−1) plus B×B. Furthermore, the local storage size becomes (2SH+2B−1)×(2SV+B−1). In other words, the overhead of the local storage size is equal to the amount of the non-overlapped input data. This example illustrates the data transfer rates and the associated local storage sizes for different level of data reuse.

Figure 4:
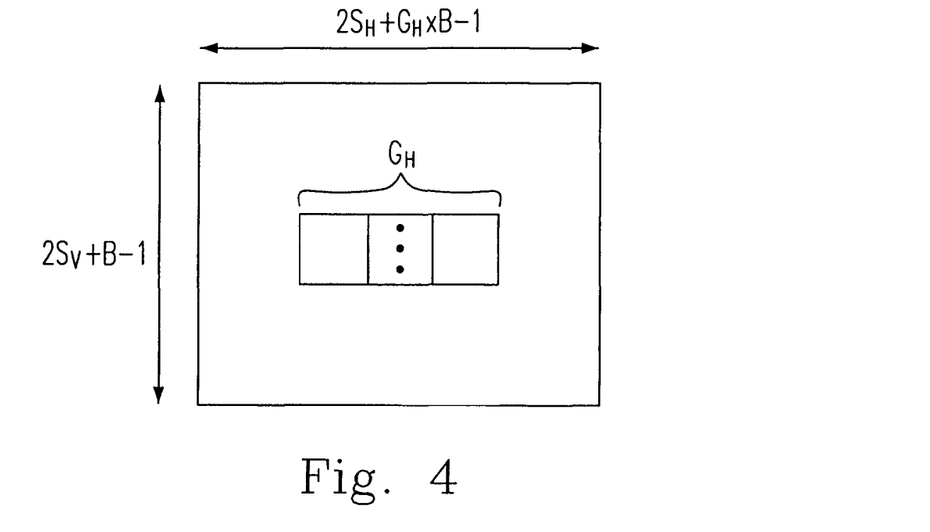
FIG. 4 is a schematic diagram of a data reuse scheme utilizing the search window overlap of two adjacent blocks in only the horizontally direction.
Figure 5:
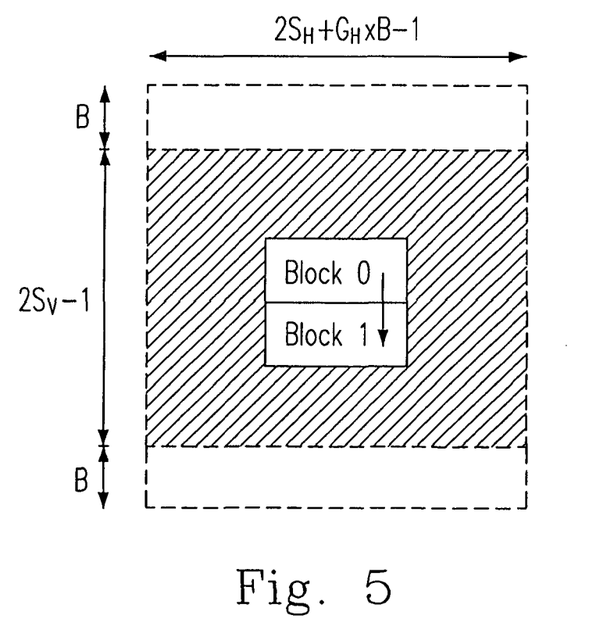
FIG. 5 is a schematic diagram of a search window of a single big block.

One intelligent way to efficiently increase the level of data reuse, thereby reducing external data transfer rate is to employ a coarser data granularity for processing so as to benefit from local spatial correlation of video. FIG. 4 is a schematic diagram of a data reuse scheme utilizing the search window overlap of two adjacent blocks in only the horizontally direction. FIG. 5 is a schematic diagram of a search window of a single big block. In FIG. 4, the data reuse scheme utilizes the search window overlap of two adjacent blocks in only the horizontally direction. In contrast, the data reuse scheme shown in FIG. 5 uses not only the horizontal overlap but also the vertical overlap at coarse data granularity, where GH horizontally adjacent blocks are encapsulated into a big one. Clearly, the size of the search windows at coarse data granularity is $(2SH+GH\times B-1)\times(2SV+B-1)$. Furthermore, FIG. 4 shows the union of the search windows needed by two horizontally adjacent big blocks, in which the executing order is now vertical scan first.

According to the search window overlap shown in FIG. 4, the amount of input data for the search window update needed by a big block is $B\times(2SH+GH\times B-1)$ and the average input data rate per pixel is $(2SH+GH\times B-1)/(GH\times B)$. The corresponding local storage size of the overall search window is $(2SH+GH\times B-1)\times(2SV+2B-1)$. Obviously, using a coarser data granularity for processing is capable of effectively raising the level of data reuse so as to reducer the average data transfer rate with overhead on local storage size.

Table 1 tabulates the comparisons of average data transfer rate and local storage size at various levels of data reuse. This table compactly reveals the leverage between average data transfer rates and local storage size at various data granularities.

TABLE 1

Comparison of different levels of data reuse

| Reuse scheme | Average data transfer rate (pixels/pixel) | Local storage size of search window (pixels) |
| --- | --- | --- |
| No data reuse | $4 \times S_H \times S_V + 1$ | $B \times B$ |
| Horizontal search window reuse | $(2Sv + B - 1)/B + 1$ | $(2S_H + 2B - 1) \times (2S_V + B - 1)$ |
| Horizontal and vertical search window reuse | $(2S_H + G_H \times B - 1)/(G_H \times B)$ | $(2S_H + G_H \times B - 1) \times (2S_V + 2B - 1)$ |

Figure 6:
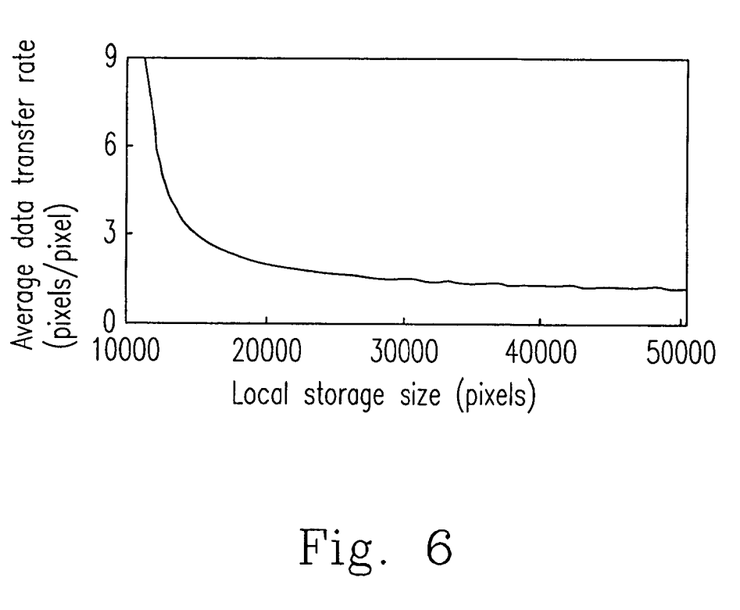
FIG. 6 shows a data rate versus storage size curve for the horizontal and vertical search window reuse scheme.

FIG. 6 further illustrates the data rate versus storage size curve for the horizontal and vertical search window reuse scheme, in which the horizontal search range, SH=64, the vertical search range, SV=32 and the block size, B=16. As the data granularity increases, the average data transfer rate decreases approximately in a reciprocal order. As a result, one can significantly reduce the external memory bandwidth by paying little overhead on the local storage size. For example, the average data transfer rate is reduced as 55% with 11% increase in the local storage size if the value of GH is set to 2. This curve showing the average data transfer rate and storage size can then facilitate the exploration of architectural space in terms of the embedded memory size and external average bandwidth. After taking the design constraints into consideration, the peak bandwidth can then be estimated.

Embodiments

1. A quantifying method for an intrinsic data transfer rate, comprising steps of:
   detecting whether or not a datum is used;
   providing a dataflow graph G including n vertices and m edges, and a Laplacian matrix L having ixj elements $L(i,j)$ when the detected datum is not reused, wherein each of the vertices represents one of an operation and a datum, each of the edges represents a data transfer, and vi is the ith vertex;
   providing a vector x having n elements such that $x^T Lx = \Sigma (xi-xj)^2$ and $(vi, vj)^\epsilon E(G)$ to calculate a maximum value of a total number of edge cuts in the m edges when the n vertices are divided into sub-graphs, each of which includes at least two adjacent vertices, wherein the n elements are n variables related to the n vertices of the dataflow graph G, and $(vi, vj)^\epsilon E(G)$ represents all operation pairs when vi is adjacent to vj; and
   using the maximum value to estimate a maximum quantity of the intrinsic data transfer rate.

2. A method according to Embodiment 1, wherein $L(i,j)$ =degree(vi) (degree of freedom of vi) when i=j, $L(i,j)=-1$ when vi is adjacent to the jth vertex vj, and $L(i,j)=0$, otherwise.

3. A method according to Embodiment 1 or 2, wherein the degree(vi) represents a total number of edges connected to the ith vertex vi, the ith diagonal element of L indicates a total number of one of operations and data connected to the ith operation, and a non-diagonal element of L represents whether two operations are connected.

4. A method according to anyone of the above-mentioned Embodiments, wherein the dataflow graph G is divided into two sub-graphs when each of the elements of the vector x has a value being one of 1 and −1, two adjacent vertices belong to the same sub-graph when they are given the same value, and two adjacent vertices respectively belong to the two different sub-graphs when they are given different values.

5. A method according to anyone of the above-mentioned Embodiments, wherein $x^T Lx = 4*$the total number of the edge cuts.

6. A quantifying method for an intrinsic data transfer rate, comprising steps of:
   detecting whether or not a datum is used;
   providing a dataflow graph G including n vertices and m edges, and an incidence dependency matrix M having ixj elements $M(i,j)$ when the detected datum is reused, wherein the i represents the ith vertex, the j represents the jth edge, each of the vertices represents one of an operation and a datum, each of the edges represents a data transfer, and vi is the ith vertex;
   providing a vector x having n elements to calculate a value of Mx so as to obtain respective representative numbers of an in-edge-cut, an out-edge-cut, and a non-edge-cut in the m edges when the n vertices are divided into sub-graphs, each of which includes at least two adjacent vertices, wherein the n elements are n variables related to the n vertices of the dataflow graph G; and
   using the incidence dependency matrix M to estimate a size of an extra local storage required due to a reuse of the datum.

7. A method according to Embodiment 6, wherein $M(i,j)=1$ when vi is a tail of the jth edge, $M(i,j)=-1$ when vi is a head of the jth edge, and $M(i,j)=0$, otherwise.

8. A method according to Embodiment 6 or 7, wherein Mx=y, the y is a vector, an element of y represents a corresponding edge is the in-edge-cut when the element has a value of 2, the element of y represents a corresponding edge is the non-edge-cut when the element has a value of 0, and the element of y represents a corresponding edge is the out-edge-cut when the element has a value of −2.

9. A quantifying method for an intrinsic data transfer rate, comprising steps of:
   detecting whether or not a datum is used;
   providing a dataflow graph G including n vertices and m edges, and a Laplacian matrix L having ixj elements $L(i,j)$ when the datum is not reused, wherein each of the vertices represents one of an operation and a datum, each of the edges represents a data transfer, and vi is the ith vertex; and
   using the Laplacian matrix L to estimate a maximum quantity of the intrinsic data transfer rate.

10. A quantifying method for an intrinsic data transfer rate, comprising steps of:
  detecting whether or not a datum is used;
  providing a dataflow graph G including n vertices and m edges and an incidence dependency matrix M having ixj elements M(i,j) when the datum is reused, wherein the i represents the ith vertex, the j represents the jth edge, each of the vertices represents one of an operation and a datum, each of the edges represents a data transfer, and vi is the ith vertex;
  using the incidence dependency matrix M to estimate a minimum amount of the intrinsic data transfer rate under a circumstance of a maximum data reuse; and
  estimating a size of an extra local storage required due to a reuse of the datum.

According to the aforementioned descriptions, the present invention provides a systemic method based on algebraic theory to quantify the algorithmic intrinsic data transfer rates at various data granularities, facilitating porting algorithms onto emerging platforms. The extracted data transfer rates of the present invention are intrinsic to algorithms and are unbiased for either hardware or software, thus, they are platform-independent and are capable of assisting in AAC for generic applications so as to possess the non-obviousness and the novelty.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A quantifying method for an intrinsic data transfer rate measured by a first operator, and transferring a first datum from a second operator to another operator, comprising steps of:
  detecting whether or not the first datum was used by the second operator;
  providing a dataflow graph G including n vertices and m edges, and a Laplacian matrix L having ixj elements L(i,j) by the first operator when the first datum being detected was not used by the second operator before, and will not be used by the second operator in the future, wherein each of the vertices represents one of an operation and a datum, each of the edges represents a data transfer, vi is the ith vertex, L(i,j)=degree(vi) (degree of vi, number of edges connected to vi) when i=j, L(i,j)=−1 when vi is adjacent to the jth vertex vj, and L(i,j)=0, otherwise;
  providing a vector x having n elements by the first operator such that $$x^t L x = \sum_{(v_i, v_j) \in E(G)} (x_i - x_j)^2$$

to calculate a maximum value of a total number of edge cuts in the m edges when the n vertices are divided into sub-graphs, each of which includes at least two adjacent vertices, wherein the n elements are n variables related to the n vertices of the dataflow graph G, and $(v_i, v_j) \in E(G)$ represents all operation pairs when vi is adjacent to vj; and
  using the maximum value by the first operator to estimate a maximum quantity of the intrinsic data transfer rate and then estimate a peak bandwidth of a bus for determining a bus width and a clock rate of the bus.

2. A method according to claim 1, wherein the degree(vi) represents a total number of edges connected to the ith vertex vi, the ith diagonal element of L indicates a total number of one of operations and data connected to the ith operation, and a non-diagonal element of L represents whether two operations are connected.

3. A method according to claim 1, wherein the dataflow graph G is divided into two sub-graphs when each of the elements of the vector x has a value being one of 1 and −1, two adjacent vertices belong to the same sub-graph when they are given the same value, and two adjacent vertices respectively belong to the two different sub-graphs when they are given different values.

4. A method according to claim 3, wherein $x^t L x = 4*$the total number of the edge cuts.

5. A method according to claim 1, wherein the first operator, the second operator, and the another operator are a first filter, a second filter, and another filter, respectively.

6. A method according to claim 1, wherein the intrinsic data transfer rate is a size of a bandwidth of a signal sent from an embedded memory to an external memory.

7. A quantifying method for an intrinsic data transfer rate measured by a first operator, and transferring a first datum from a second operator to another operator, comprising steps of:
  detecting whether or not the first datum was used by the second operator;
  providing a dataflow graph G including n vertices and m edges, and an incidence dependency matrix M having ixj elements M(i,j) by the first operator when the first datum being detected was used by the second operator before, and will be used by the second operator in the future, wherein the i represents the ith vertex, the j represents the jth edge, each of the vertices represents one of an operation and a datum, each of the edges represents a data transfer, vi is the ith vertex, M(i,j)=1 when vi is a tail of the jth edge, M(i,j)=−1 when vi is a head of the jth edge, and M(i,j)=0, otherwise;
  providing a vector x having n elements by the first operator to calculate a value of Mx so as to obtain respective representative numbers of an in-edge-cut, an out-edge-cut, and a non-edge-cut in the m edges when the n vertices are divided into sub-graphs, each of which includes at least two adjacent vertices, wherein the n elements are n variables related to the n vertices of the dataflow graph G; and
  using the incidence dependency matrix M by the first operator to estimate a size of an extra local storage required, being a memory device, due to the first datum detected being used by the second operator before, and being to be used by the second operator in the future.

8. A method according to claim 7, wherein Mx=y, the y is a vector, an element of y represents a corresponding edge is the in-edge-cut when the element has a value of 2, the element of y represents a corresponding edge is the non-edge-cut when the element has a value of 0, and the element of y represents a corresponding edge is the out-edge-cut when the element has a value of −2.

9. A quantifying method for an intrinsic data transfer rate measured by a first operator, and transferring a first datum from a second operator to another operator, comprising steps of:

detecting whether or not the first datum was used by the second operator;

providing a dataflow graph G including n vertices and m edges, and a Laplacian matrix L having ixj elements L(i,j) by the first operator when the first datum being detected was not used by the second operator before, and will not be used by the second operator in the future, wherein each of the vertices represents one of an operation and a datum, each of the edges represents a data transfer, vi is the ith vertex, L(i,j)=degree(vi) (degree of vi, number of edges connected to vi) when i=j, L(i,j)=−1 when vi is adjacent to the jth vertex vj, and L(i,j)=0, otherwise; and using the Laplacian matrix L by the first operator to estimate a maximum quantity of the intrinsic data transfer rate and then estimate a peak bandwidth of a bus for determining a bus width and a clock rate of the bus.

10. A quantifying method for an intrinsic data transfer rate measured by a first operator, and transferring a first datum from a second operator to another operator, comprising steps of:

detecting whether or not the first datum was used by the second operator;

providing a dataflow graph G including n vertices and m edges and an incidence dependency matrix M having ixj elements M(i,j) by the first operator when the first datum being detected was used by the second operator before, and will be used by the second operator in the future, wherein the i represents the ith vertex, the j represents the jth edge, each of the vertices represents one of an operation and a datum, each of the edges represents a data transfer, vi is the ith vertex, M(i,j)=1 when vi is a tail of the jth edge, M(i,j)=−1 when vi is a head of the jth edge, and M(i,j)=0, otherwise;

using the incidence dependency matrix M by the first operator to estimate a minimum amount of the intrinsic data transfer rate under a circumstance of a maximum data reuse; and estimating a size of an extra local storage required, being a memory device, by the first operator due to the first datum detected being used by the second operator before, and being to be used by the second operator in the future.

* * * * *